United States Patent [19]
Perry et al.

[11] Patent Number: 5,451,033
[45] Date of Patent: Sep. 19, 1995

[54] HEAT PROCESSING APPARATUS

[75] Inventors: Ophneil H. Perry, Kingswinford; Geoffrey Riley, Kidderminster, both of Great Britain

[73] Assignee: Stein Atkinson Stordy Limited, Wombourne, Great Britain

[21] Appl. No.: 167,998

[22] PCT Filed: Jun. 19, 1992

[86] PCT No.: PCT/GB92/01120
§ 371 Date: Dec. 21, 1993
§ 102(e) Date: Dec. 21, 1993

[87] PCT Pub. No.: WO93/00450
PCT Pub. Date: Jan. 7, 1993

[30] Foreign Application Priority Data
Jun. 28, 1991 [GB] United Kingdom .......... 9114030

[51] Int. Cl.6 ............................................. F27B 7/02
[52] U.S. Cl. ................................ 266/145; 266/205; 266/901
[58] Field of Search ............... 266/138, 145, 901, 205; 75/401

[56] References Cited

U.S. PATENT DOCUMENTS

| | | | |
|---|---|---|---|
| 1,441,351 | 1/1923 | Hindshaw | 266/145 |
| 4,200,262 | 4/1980 | Evans et al. | 266/901 |
| 5,186,740 | 2/1993 | Sancinelli | 266/901 |

FOREIGN PATENT DOCUMENTS 0151518 10/1920 United Kingdom .
2229801 10/1990 United Kingdom .

*Primary Examiner*—Scott Kastler
*Attorney, Agent, or Firm*—Learman & McCulloch

[57] ABSTRACT

Apparatus for the continuous heat processing of scrap materials, particularly for decontaminating aluminum can scrap, has a rotary kiln defining a furnace chamber along which the material is fed and a hot gas circulation system including a duct leading through the chamber from the input end to an enclosure at the output end from which the gases pass back in contra-flow to the material through the furnace chamber itself to return to the input end. The gas circulation system also includes an after burner through which the exhausted gases are recirculated, and being at the input end of the furnace to provide a compact unitary and readily adaptable construction in which heat losses are minimized.

5 Claims, 1 Drawing Sheet

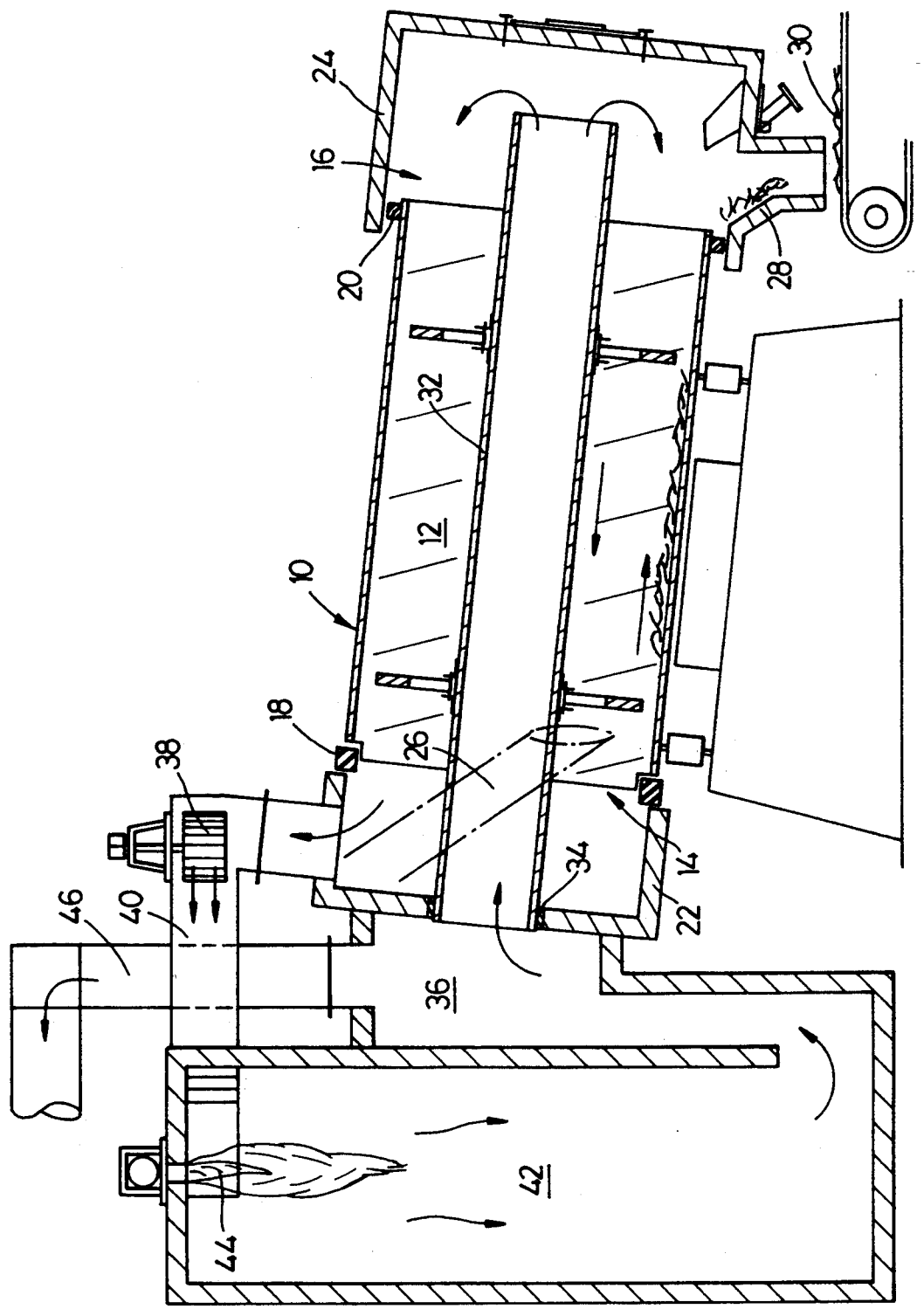

HEAT PROCESSING APPARATUS

This invention relates to apparatus for heat processing scrap materials in the recovery of their useful constituents and removal as by vapourization or burning of contaminants such as lacquer or paint coatings. The invention is particularly but not exclusively applicable to scrap metal materials, for example in the recycling of metal containers typically aluminium or aluminium alloy beverage cans.

BACKGROUND OF THE INVENTION

It is known to provide apparatus of the kind referred to and incorporating a heated furnace kiln through which the scrap material is passed, with circulation of hot gases through the kiln in a closed circuit for said vapourization or burning of contaminants. An example of such apparatus incorporating a rotary kiln is disclosed in U.S. Pat. No. 5,055,037, issued Oct. 8, 1991, the disclosure of which is incorporated by reference.

The object of the present invention is to provide heat processing apparatus for the above purpose, e.g. incorporating a rotary kiln, which is economical to manufacture and install, compact, adaptable in design, and effective and efficient in operation.

SUMMARY OF THE INVENTION

According to the invention there is provided apparatus for heat processing scrap material to separate contaminants therefrom comprising kiln structure defining an enclosed furnace chamber having a feed path extending therethrough from a material input end to a material output end of the chamber: and gas circulation means for providing a flow of heated gases into and through the chamber to act directly on material in said feed path in use; characterised in that said kiln structure includes:
 a) a rotating kiln defining the major part of said chamber and feed path
 b) a first non-rotating enclosure formation through which a material inlet opens into the input end of the chamber, which formation is connected through an air-tight seal to the input end of said kiln, and from which opens an outlet flue through which the gases exit from the chamber; and
 c) a second non-rotating enclosure formation from which a material discharge outlet opens from the output end of the chamber which formation is connected through an air-tight seal to the output end of said kiln:
and in that the gas circulation means includes an inlet duct extending through said first formation and axially through the kiln to open into the chamber adjacent the output end, whereby the whole of said flow of gases returns through the furnace chamber from the latter end to the input end in direct contact with the material travelling in the opposite direction along said feed path in use Said gas circulation means may include a recirculation connection externally of the kiln and at or adjacent said input end thereof for operative recirculation of at least part of the gases exhausted from the furnace through the outlet flue.

Said circulation means may further include flow inducing means for forced movement of gases through the furnace: control means for regulating the operating temperature of the gases; an after burner for high temperature disposal or breaking down of the contaminant content of the gases so exhausted at a higher temperature than the operating temperature within the chamber; and/or cooling means acting on the gases fed to the inlet duct to reduce their temperature to a predetermined level.

BRIEF DESCRIPTION OF THE DRAWING

An embodiment of the invention is now more particularly described with reference to the accompanying drawing being a diagrammatic longitudinal sectional elevation of apparatus for heat processing aluminium alloy beverage can scrap for removal from the shredded scrap material of lacquer coating and other contaminants prior to recovery and remelting of the metal content for recycling.

DETAILED DESCRIPTION

The apparatus comprises a rotary kiln 10 defining an enclosed furnace chamber 12. The axis of the kiln is inclined so that it slopes downwardly from its material input end 14 to its material output end 16 i.e. from left to right as viewed in the drawing, the extremities of the rotating kiln being provided with airtight seals 18, 20 connecting it with respective non-rotating upper and lower enclosure formations 22, 24 at said respective ends in conventional manner.

The scrap material is fed into the chamber from a hopper or the like (not shown) through a delivery chute 26 opening into inlet end 14 to pass along a feed path through the rotating kiln, exiting from a discharge chute 28 at the output end 16 to drop onto a conveyor 30.

Gas circulation means of the apparatus comprises an inlet duct 32 extending co-axially of chamber 12 through the rotating kiln 10 to open into said chamber within closure formation 24 i.e. at the material output end of the chamber. Duct 32 is conveniently mounted for rotation with kiln 10, its upper end opening through the end wall of the closure formation 22 at the material input end of the chamber by way of a further airtight seal 34.

Heated gases at controlled temperature are fed into duct 32 from an ante-chamber 36 defined by fixed structure of the gas circulation means all of which is at or immediately adjacent to said material input end 14.

It is preferred that the gas flow within chamber 12 is operated at negative pressure, i.e. less than ambient atmospheric pressure in the manner described in the aforementioned U.S. Pat. No. 5,055,037 to avoid any escape of contaminated gases e.g. if there should be any leakage past the various seals.

Said negative pressure is induced by a centrifugal fan 38 in an outlet flue 40 opening from the top of closure formation 22 at the material input end 14 of chamber 12.

Thus the circulation of hot gases through chamber 12 is firstly along duct 32 not in direct contact with the material flow but supplying indirect heat by radiation from the exterior of duct 32, then by flow in direct contact with the material from end 16 up to end 14 i.e. in the opposite direction to the travel of the material. through kiln 10 to be exhausted from said chamber through flue 40 under the action of fan 38.

Flue 40 opens into the upper end of a vertical after burner chamber 42 disposed alongside ante-chamber 36 and containing a gas fuelled or other burner head 44, the temperature in chamber 42 being such that the lacquer and other contaminant content of the exhaust gases is further broken down at a higher temperature than that in the kiln chamber 12. The gases exiting from the bottom of chamber 42 pass into the ante-chamber 36, a proportion thereof being recirculated through the kiln chamber 12 as described above and a proportion being led off from ante-chamber 36 through a branch duct 46 for after-treatment and eventual disposal. Provision (not shown) may be made for cooling the gases fed into furnace chamber 12.

Delivery chute 26 is preferably arranged so that the material passing therethrough is preheated, e.g. in part by radiant heat from the upper end of inlet duct 32, for drying the material and raising its temperature before it enters the chamber 12, again providing increased efficiency of operation and minimising heat loss.

It will be seen that substantially the whole of the gas circulation means other than the parts actually contained within chamber 12 are located at or immediately adjacent to the material input end 14 thereof. Thus external duct work is reduced to a minimum so saving; cost and labour in manufacture and installation and also enhancing operative efficiency by reducing heat loss.

The compact construction also saves space and facilitates control and monitoring of operation. Control means (not shown) are provided for monitoring and regulating the operating temperatures in chamber 12 and elsewhere, regulating the flow rate of the gases etc as described in U.S. Pat. No. 5,055,037.

Moreover standard gas circulation means or components thereof and related and ancillary equipment can be employed without any substantial modification to serve a range of sizes of rotary kiln, in particular the axial length of kiln 10 and the associated inlet duct 32 can readily be varied by merely altering the spacing between the external parts of the gas circulation means and the stationary enclosure formation 24 at the material output end 16 remote from the circulation means, no rearrangement or reconstruction of external ducting or the like being necessary.

Apart from the features referred to above the manner of operation and its automatic control and monitoring will be effected substantially as described in the above identified U.S. patent.

We claim:

1. Apparatus for the continuous heat processing of metal scrap material contaminated with coating substances to purify and recover the metal content and to diminish or destroy the contaminants with minimum atmospheric pollution, such apparatus comprising:

kiln structure defining an enclosed furnace chamber having a scrap material feed path extending therethrough from a scrap material input end to a scrap material output end of the chamber, and gas circulation means for providing a flow of hot gas into and through the chamber at such temperature as to act directly on the scrap material in said feed path to purge the contaminants therefrom, said kiln structure including:

a rotating kiln defining the major part of said chamber and feed path, a first non-rotating enclosure formation through which a material inlet opens into the scrap material input end of the chamber, said formation being connected via an air tight seal to the scrap material input end of said chamber, and from which extends an outlet flue through which the hot gas exits the chamber, and a second non-rotating enclosure formation from which a material discharge outlet opens from the scrap material output end of the chamber, said second formation being connected via an air-tight seal to the output end of said chamber;

and said gas circulation means including:

a hot gas inlet duct extending through said first formation and coaxially through the kiln parallel to said feed path for radiating heat to material in said feed path, said inlet duct opening into the chamber via said second enclosure formation and adjacent the scrap material output end, whereby the whole of said flow of hot gas returns through the furnace chamber from the output end to the input end in direct contact with the material traveling in the opposite direction along said feed path, a recirculation connection externally of the kiln structure and at or adjacent said first enclosure formation for operative recirculation of at least part of the hot gas exhausted from the furnace chamber through said outlet flue to said inlet duct, said recirculation connection including flow inducing means acting to exhaust said hot gas from the input end of the chamber whereby the gas pressure within the chamber is less than that of the ambient atmosphere external of the chamber, and an after-burner in communication with said inlet duct for receiving said exhausted gas and raising the temperature of such exhausted gas to a level at which the contaminant content of said exhausted gas is at least diminished and heat from said exhausted gas may be radiated from said inlet duct.

2. Apparatus as in claim 1 wherein the rotating kiln is centered on an inclined axis to facilitate the feed of material therethrough with the first formation at the upper end and the second formation at the lower end.

3. Apparatus as in claim 2 wherein the inlet duct rotates in common with the kiln.

4. Apparatus as in claim 1 wherein the circulation means includes control means for regulating the operating temperature of said hot gas.

5. Apparatus as in claim 1 wherein said material inlet leading to said input end of the chamber is a chute so disposed as to be subjected to heat from the gas circulation means whereby the material is operatively preheated for entry to the chamber.

* * * * *